Sept. 29, 1964   G. E. HANSEN ETAL   3,150,681
BALL VALVE

Filed May 29, 1961   2 Sheets-Sheet 1

Inventors.
George E. Hansen,
Anton Korzenowski,
Carl R. Stone &
Robert H. Peterson.
By Joseph O. Lange
Atty.

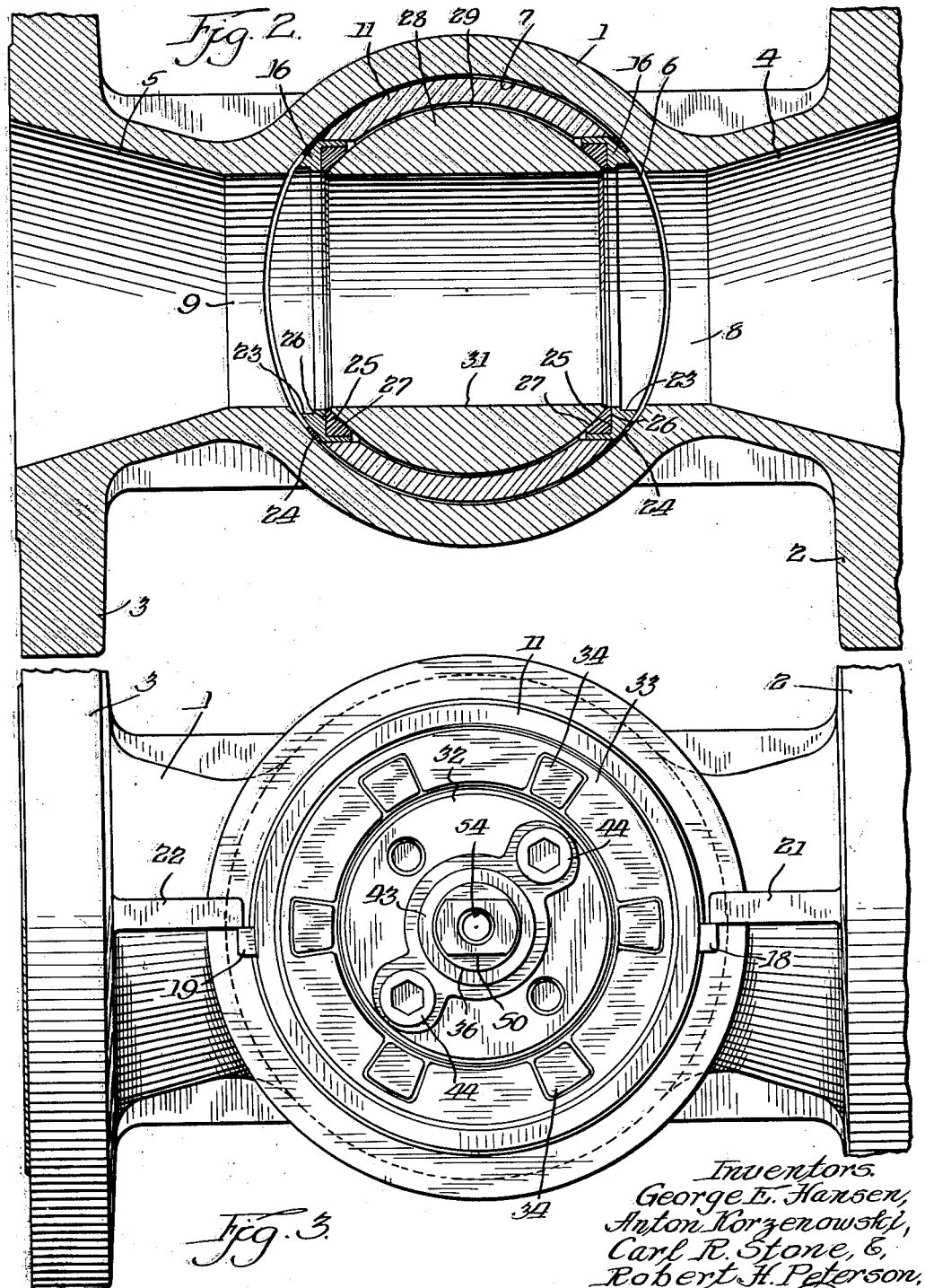

United States Patent Office 3,150,681
Patented Sept. 29, 1964

3,150,681
BALL VALVE
George E. Hansen, Elmwood Park, Anton Korzenowski, Brookfield, Carl R. Stone, Lombard, and Robert H. Peterson, Norridge, Ill., assignors to Crane Co., Chicago, Ill., a corporation of Illinois
Filed May 29, 1961, Ser. No. 121,288
6 Claims. (Cl. 137—454.2)

This invention relates generally to a rotary plug type of valve, and, more particularly, it is concerned with that kind of valve commonly known to those skilled in the art as a ball or spheroidal valve. This contribution is an improvement over the type of valve of which one of the co-inventors of this application is the inventor of the patent application identified as a Ball Valve, Serial No. 15,975, filed March 18, 1960, now issued as U.S. Patent No. 3,081,792, granted March 19, 1963.

Heretofore in valves of this type, especially where relatively larger sizes are involved, it has been difficult to provide absolute valve tightness, while providing for a single or one-piece body, and at the same time eliminating extra joints and connections to be fluid sealed, the bonnet and end flanges of the valve being usually bolted in an effort to overcome the otherwise dangerous effects of line strains. Thus, it is an important object of this invention to provide a one-piece valve body construction while eliminating extra joints, flanges, and bonnet bolting, but at the same time providing a valve embodying a construction of highly durable character and amply resistant to pipe line strains.

A further object is to provide a valve construction in which a tapered or frusto-conical cartridge or cage member is conveniently employed and is sturdily secured in the valve body by means of a centrally disposed nut at the lower exterior portion of the body whereby to insure uniform loading of the seats against the ball closure member and also in the body sealing means between the body chamber and cage.

Another object is to provide for a ball valve construction in which limited take-up or adjustment of the cage preferably externally of the valve can be conveniently and uniformly provided.

A further object is to provide for a construction in which quick disassembly of the complete cartridge or the individual seat rings is easily provided.

Another object is to provide for a rotary plug valve construction in which the assembly of the ball closure member takes through a top opening in the valve cartridge, thereby facilitating a compact design in compliance with the requirements of the American Standards Association relating to face-to-face dimensions of flanged valves.

A still further object is to provide for a valve in which the valve seats make a static seal with the tapered body walls and a dynamic seal is effected with the ball closure member.

A further object is to provide for a ball valve construction in which objectionable recesses or pockets both in the body and the valve closure member are eliminated, while at the same time an open wedge or pitched bottom on the interior of the valve allows for the easy draining and line cleaning in such industries as those handling food products as well as in chemical processing.

A still further object is to provide for a valve body construction in which the webbing or similar suitable means preferably made integral with the body allow for the convenient and accurate alignment of the interiorly disposed cage member with relation to the body and the plug ball retainer. The construction avoids the prior objections of springs or adjusting bushings in the flow media and further permits the beneficial application of a uniform loading on the valve seats and cage supporting material.

Another important object is to provide for a construction in which positive means are provided for preventing rotation of the cage or plug ball retainer and the bonnet. Further, the cooperation of these parts as will hereinafter be clear prevents rotation of the bonnet in the assembly.

A further advantage will become apparent in the structural provision of a novel retainer for the valve seat rings wherein the latter when inserted in their assembled valve position engage the bonnet to lock the complete unit. To disassemble the cartridge or cage unit, the locknut for the cage is removed and the complete unit is then removable as such from the valve.

Other objects and advantages will become more readily understood upon proceeding with the construction read in light of the accompanying drawings, in which:

FIG. 2 is a transverse sectional view taken on the line 2—2 of FIG. 1; and

FIG. 3 is a plan exterior view with the handle and eye hook removed.

Similar reference numerals refer to similar parts throughout the several views.

Figure 1:
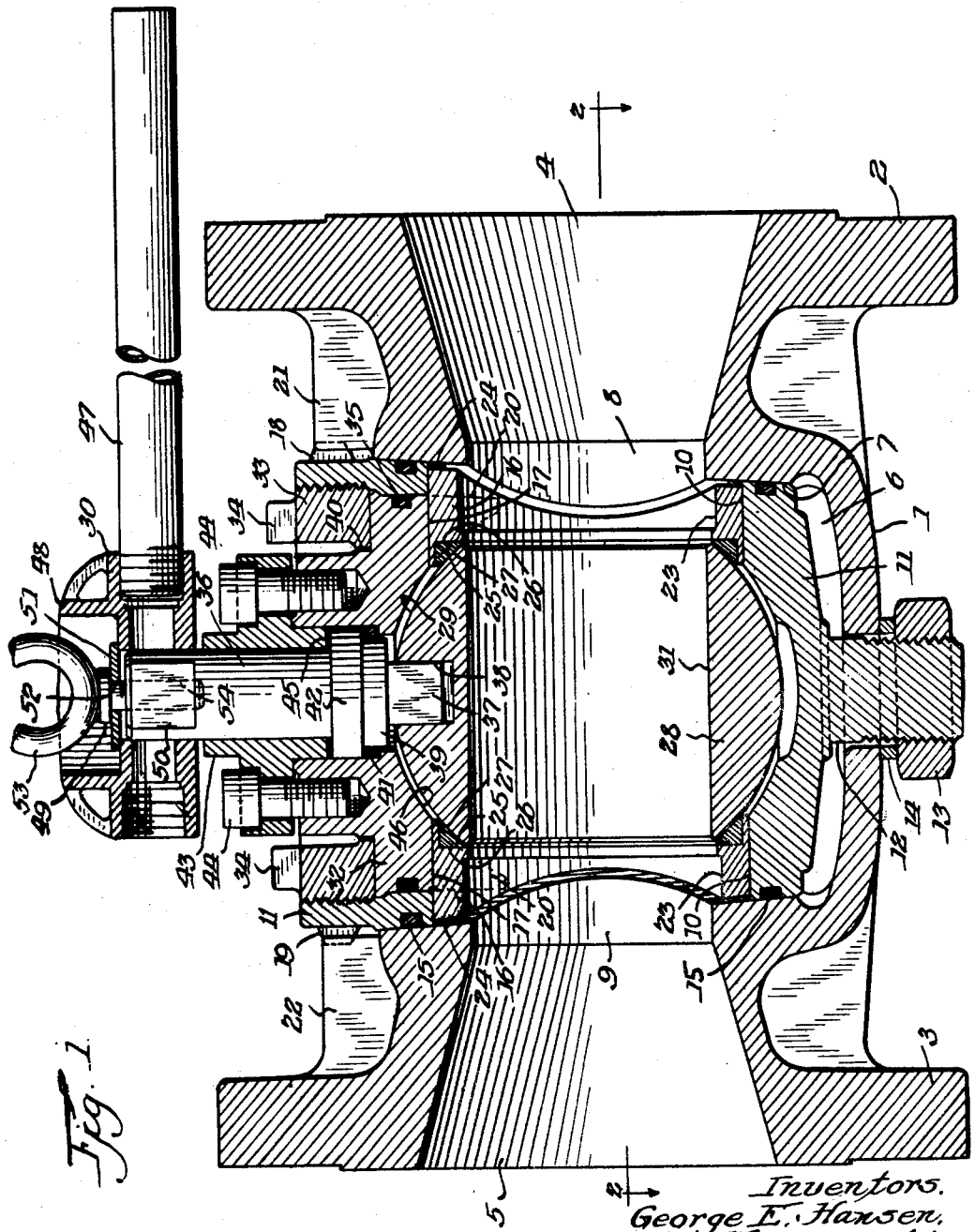
FIG. 1 is a sectional assembly view of a preferred embodiment of our invention.

Referring now to FIG. 1, a conventional ball valve body 1 is shown having the usual end flanges 2 and 3 for effecting attachment to a pipe line (not shown) and which are provided with the respective inlet port 4 and outlet port 5. Obviously, these ports may be reversed if desired. At a central portion thereof, the valve body is hollow to provide for a central valve chamber 6, the peripheral limits of which are defined by the frusto-conical surface 7 interrupted by the transverse ports 8 and 9 communicating at their inner portions with the chamber 6. In snug fitting frusto-conical relation thereto, a cage member 11 is assembled in the body having at its lower end portion a depending threaded shank 12. The latter is provided with an end disposed nut 13 between which is interposed the washer 14 to hold the said hollow cage member 11 securely in fluid sealing relation within the body and preferably in nonrotatable relation thereto after being positioned in place. The washer 14 may be of a resilient material to hold said cage member similarly in the casing. The frusto-conical cage member 11 is preferably sealed at 15 by suitable O-rings or packing within said body and is transversely ported as at 10. The alignment of the ports 10 with the central axis of the valve body and its ports 8 and 9 is assured by means of the cage lugs 18 and 19 which abut the respective outer ribs 21 and 22 on the body as shown more clearly in the plan exterior view of FIG. 3. The numerals 23 define the inner periphery or ports of the respective seat ring retainers 16, 16.

Annularly occupying the cage ports 10, are the seat ring retainers 16 which are fitted snugly within the ports 10. The outer ends of the seat ring retainer members 16 cooperate with the preferably resilient annular means such as the end washers 24 and fit within the port 10 of the cage member 11, the latter being preferably of a plastic composition or the like and formed to fit the arcuate ends of the retainers 16 at their outer limits as indicated. By their inherent resilience, they exert a force against the seat retainers 16 axially inwardly toward the ball 28. It will be clear that the thickness of the washers 24 may be varied depending upon the wear of the seats 26 in service and the degree of resilience desired in maintaining a tight valve. At inner portions thereof, annular recesses 25 are defined to receive annular seat members 26 of substantialy triangular cross section. On their inner peripheral portions, they are provided with contact surfaces at 27 for fluid sealing engagement with the ball closure member 28. The said contact surfaces are preferably of spheroidal configuration and thus provide the arcuately extending concave surfaces to abut the spheroidal outer surface 29 of the ball closure member 28. The said ball member is ported as at 31 for fluid flow therethrough when in the valve open position shown in FIG. 1.

To retain the ball closure member firmly in position, a bonnet member 32 is provided preferably having on an underportion thereof an arcuately extending surface 17 for receiving and saddle mounting the bonnet 32 snugly over the outer curved surfaces of the seat rings 16. The bonnet curved surfaces 17 extend arcuately over the respective seat retainers 16 substantially to the extent indicated by the dotted lines at 20.

The bonnet 32 is preferably held in place by means of the threaded holding member 33 having the tightening lugs 34 and being sealed within the hollow portion of the cage 11 by means of the O-ring 35. The said member 33 is apertured to receive the annular shoulder portion at 40 provided on the bonnet 32, thus to permit the latter member to project therethrough as shown.

For purpose of effecting the actuation of the rotatable ball closure member 28, the stem 36 is provided, having at its lower or inner end portion a polygonal extension 37 non-rotatably engaging a similarly recessed portion 38 of the ball closure member 28. For sealing the closure member against fluid escape at a location through the bonnet, the stem shouldered portion 39 is provided as at 41 with sealing rings 41, applied as indicated, and to further insure the proper spacing and axial positioning of the stem 36 relative to the ball closure member a second annular shoulder 42 is provided on the stem as shown. It is retained in place by means of the bolted flange or bushing member 43 through which the stem 36 projects, and said retainer member being connected to the bonnet 32 by means of the cap screws 44 and the interposed thrust washer 45. It will also be noted that the latter member bears against the annular shoulder 42 whereby to receive the thrust of the ball member outwardly. It will also be clear that said ball member is preferably positioned in spaced apart relation to the bonnet undersurface 46 because of the support of the ball by the projection inwardly of the body annular seat rings 27 as illustrated. The said spaced apart relationship of the ball member with reference to the said bonnet also applies to the lower portion of the ball closure member 28 relative to the upper concave surface of the cage 11.

It will be appreciated that by the structural arrangement just described, the ball is rotated with substantially reduced frictional resistance and further there is a desirable wiping action on the ball surface 29 as the ball is rotated during valve opening and closing operations thereby to maintain the fluid sealing contact surface in clean condition and with improved sealing function.

For the actuating mechanism in opening and closing the valve, it will be understood that the ball 28 moves in a 90° arc to effect the latter operation, a preferably easily removable lever 47 is used to engage the adapter member 48 by means of a threaded connection as indicated. The said adapter is held in place on the stem by means of a threaded screw attachment at 49 on the stem polygonal extension 50 and retained firmly by the threads indicated at 54. The interposed washer 51 at its upper shoulder portion 52 is provided with an eye hook 53, preferably integrally attached, which when the bonnet and its related retaining members have been removed and it becomes desirable to inspect the ball closure member and cage assembly, a chain (not shown) or other lifting means may be used for such purpose.

It will also be clear that by the novel arrangement of projecting the seat rings 27 slightly past the inner ends of seat retainers 16 into the central portion of the cage 11 the usual frictional resistance is not only reduced, but an improved seating contact is provided between the ball 28 and seats 27 during opening and closing of relatively large valves. It will also be clear that the mounting of the retaining means in the manner hereinabove described the rotation and inaccurate positioning of the ball retainers and the bonnet is effectually prevented. Thus, the assembly of these two parts provides for an efficient rotation inhibiting device to prevent rotation of the bonnet and cage assembly.

The seat rings when inserted into the bore of the plug ball retainer and engaging contour of the bonnet at said arcuate surface 17 and extending arcuately thereover as indicated by said dotted lines 20 to lock the complete seating unit in place in the valve body. Thus to disassemble the cartridge unit, the lower plug nut 13 is removed and the complete unit is easily lifted out of the valve body.

It will also be clear that no springs or adjusting bushings are provided in the flow media to be damaged by the latter and the lock washer provides a uniform load on the seating means 27 and the plastic composition employed as well as at rings 24. It will further be understood that the body lugs or ribs 21 and 22 in their abutment with the lugs 18 and 19 of the threaded retainer insure the accurate installation of the ball plug retainer in alignment with the ports of the body. The lugs also eliminate a relative turning motion between said ports while also assuring a foolproof assembly in the field when and if the latter becomes necessary.

While only a single embodiment is shown and described, it will be of course apparent that this is only for purpose of illustration and not of limitation. The invention should be measured in accordance with the claims appended hereto.

We claim:

1. A ball valve, a ported casing therefor, a ported rotatable spheroidal closure member mounted within said casing, a frusto-conical ported cage member receiving said closure member mounted in fluid sealing relation to the casing, body seat rings and body seat ring retainers for the said closure member mounted in ports of said cage member limitedly movable axially relative to said closure member, resilient annular means interposed in the ports of said cage member between and in contacting relation with said casing and body seat ring retainers around the ports of the casing, means cooperating with said casing for holding said cage member against substantial axial movement relative to said casing in one direction and in biased relation to said resilient annular means in the opposite directions, retaining means on the cage member for retaining the said closure member within said cage member, cover means at an outer portion of the casing for retaining said closure member in axially fixed rotatable relation to said cage member, the said closure member retaining means engaging a peripheral portion outwardly of said body seat ring retainers and complementary stop means on said casing and cage member engageable for aligning the ports of the said gage member axially with the ports of said casing.

2. In a rotary ball plug valve, the combination of a valve casing with a ported central chamber having tapered walls, a ball closure member having ports mounted for rotative movement within said chamber, a stem for effecting said rotation, a frusto-conical cage member snugly fitted within the tapered walls defining the said chamber, body seat ring retainers carried by the said cage member, body seat rings on the inner annular end portions of said body seat ring retainers for engagement with said closure member, bonnet means with an undersurface straddling an outer arcuate portion of said body seat ring retainers within said cage member for positioning said closure member relative to said seat rings and providing journalling means for said stem, said undersurface of the bonnet means being relieved at an inner portion thereof to receive in spaced apart relation an outer spheroidal portion of said closure member.

3. A ball valve, a ported casing therefor, a ported rotatable spheroidal closure member mounted within a chamber of the said casing, a frusto-conical ported cage member in the casing chamber to receive the said closure member, the said cage member being mounted in fluid sealing relation to the walls defining the said chamber of the casing, means cooperating with a lower portion of said casing for holding said cage member in fixed non-rotatable position relative to the said casing, transversely extending body seat carrying means in the ports of said cage member aligned with the ports of said closure member, seats for the said closure member mounted on inner annular relieved portions of the said carrying means, bonnet means engaging said cage member for retaining said closure member in axially fixed rotatable relation to said cage member, the said bonnet means engaging a peripheral upper portion of said body seat carrying means, a threaded holding member for said bonnet means and means on said casing cooperating with means on the said cage member for aligning the ports of said cage member substantially axially with the ports of said casing.

4. The subject matter of claim 3, the said means cooperating with said casing for holding said cage member in fixed non-rotatable position relative to the said casing including a washer with at least a portion thereof of resilient material, the said washer being interposed between said casing and said means holding said cage member in non-rotatable relation to said casing.

5. The subject matter of claim 4, fluid sealing annular means interposed between outer end portions of said seat carrying means and the walls defining the chamber of said casing for resiliently urging said seat carrying means axially in a direction toward the said closure member.

6. In a ball valve, the combination of a ported casing therefor, a ported rotatable spheroidal closure member mounted within the said casing, a frusto-conical ported cage member open at an upper portion thereof for receiving said closure member, the said cage member having annularly disposed gasket means around its ports for effecting fluid sealing contact with the casing, means on a lower portion of said casing for holding said cage member in fixed position relative to the said casing, means cooperating with the cage member for retaining the said closure member within said cage member, body seat rings and annular retainers therefor oppositely disposed in ports of said cage member, means for retaining said closure member in axially fixed rotatable relation to said cage member, the said closure member retaining means arcuately engaging a peripheral portion of said retainers for the body seat rings and visual means on an outer portion of said casing and cage member for aligning axially the ports of said cage member with the ports of said casing.

References Cited in the file of this patent

UNITED STATES PATENTS

| | | |
|---|---|---|
| 1,941,839 | Johansson | Jan. 2, 1934 |
| 2,885,179 | Hartmann | May 5, 1959 |
| 3,014,690 | Boteler | Dec. 26, 1961 |
| 3,058,484 | Feiring | Oct. 16, 1962 |
| 3,067,978 | Natho | Dec. 11, 1962 |
| 3,081,792 | Hansen | Mar. 19, 1963 |
| 3,091,428 | Magos | May 28, 1963 |

FOREIGN PATENTS

| | | |
|---|---|---|
| 403,389 | Great Britain | Dec. 18, 1933 |